United States Patent Office 3,136,657
Patented June 9, 1964

3,136,657
POLYVINYL ALCOHOL FILM COATED WITH VINYLIDENE CHLORIDE-VINYL CHLORIDE COPOLYMER
Daniel S. Dixler, Berkeley Heights, and Robert A. Eodice, Scotch Plains, N.J., assignors to Air Reduction Company, Incorporated, New York, N.Y., a corporation of New York
No Drawing. Filed Feb. 15, 1962, Ser. No. 173,360
13 Claims. (Cl. 117—138.8)

This invention relates to transparent packaging films and more particularly to coated films having a polyvinyl alcohol base and a vinylidene chloride-vinyl chloride copolymer coating.

A number of coated transparent film compositions have been previously described in the art for use as packaging films. While some of these films are reported to have low permeability to oxygen, the permeability nevertheless is not low enough to permit storage of perishable foods for long periods of time. For example, various food products such as ground meat, luncheon meat, and cheese deteriorate in a comparatively short period of time when wrapped in presently known coated plastic films.

An object of this invetnion is to provide a coated transparent plastic film having extremely low oxygen permeability.

Another object of this invention is to provide a packaging film having as its base polyvinyl alcohol of low oxygen permeability.

A further object of this invention is to provide a film which comprises a polyvinyl alcohol base and an adherent vinylidene chloride-vinyl chloride copolymer coating.

These and other objects will be apparent from the specification.

The packaging film compositions of this invention comprise a thin flexible base layer of polyvinyl alcohol coated with a polymer mixture consisting essentially of about 90 to 95% of a copolymer of about 50 to 75% vinylidene chloride and 25 to 50% vinyl chloride, and about 5 to 10% of a terpolymer of about 75 to 94.5% vinyl chloride, 5 to 24.5% vinyl acetate, and 0.5 to 5% of a compound selected from the group consisting of ethylenically unsaturated carboxylic acids and anhydrides thereof.

Polyvinyl alcohol is a very desirable base material for packaging films because it has a low oxygen permeability as compared to other materials, such as regenerated cellulose, which are at present commonly used for packaging. Polyvinyl alcohol also has good tensile strength, elongation, tear strength, and bursting strength, and is readily shaped by conventional techniques using heat and vacuum. However, uncoated polyvinyl alcohol is not suitable for general use as a packaging film because the oxygen permeability of the material increases when the film is in a high humidity atmosphere. It is necessary to coat the polyvinyl alcohol base film with a material which will protect it from water vapor in the atmosphere, in order to preserve its oxygen barrier properties.

Vinylidene chloride-vinyl chloride copolymers make excellent coatings for transparent packaging films, because they markedly improve the oxygen permeability of the film and protect the film from contact with moisture, thereby improving water vapor impermeability also. However, vinylidene chloride-vinyl chloride copolymers do not adhere readily to polyvinyl alcohol, and films of polyvinyl alcohol coated with a vinylidene chloride-vinyl chloride copolymer in the absence of a bonding agent are easily delaminated.

It has been found according to this invention that a polymer mixture containing a small amount of a terpolymer of vinyl chloride, vinyl acetate, and a compound selected from the group consisting of ethylenically unsaturated aliphatic carboxylic acids and anhydrides thereof, in admixture with a vinylidene chloride-vinyl chloride copolymer, adheres readily to polyvinyl alcohol, providing a coated film of outstanding oxygen impermeability and satisfactory water vapor impermeability. The terpolymer constitutes only about 5 to 10% by weight of the polymer mixture, the remainder being the vinylidene chloride-vinyl chloride copolymer. The amount of terpolymer should not be much larger than 10% of the polymer mixture, because larger amounts adversely affect water vapor impermeability of the film.

The vinylidene chloride-vinyl chloride copolymer contains about 50 to 75% by weight of vinylidene chloride and conversely about 25 to 50% vinyl chloride. An excellent copolymer for use in this invention is a copolymer of about 60% by weight vinylidene chloride and about 40% vinyl chloride. This copolymer is commercially available under the trade name "Geon 222," which is made and sold by the B. F. Goodrich Co., Akron, Ohio.

The terpolymer contains about 75 to 94.5% by weight vinyl chloride, about 5 to 24.5% vinyl acetate, and about 0.5 to 5% of a compound selected from the group consisting of ethylenically unsaturated aliphatic acids and anhydrides thereof. The unsaturated acid or anhydride is preferably a compound containing 3 to 6 carbon atoms, such as acrylic acid, methacrylic acid, crotonic acid, maleic acid, maleic anhydride, itaconic acid, and the like. Maleic anhydride is a preferred compound. The unsaturated acid or anhydride is an essential component of the terpolymer which confers affinity of the polymer mixture for the polyvinyl alcohol base. Excellent terpolymers for use as components of the polymer mixture are a terpolymer containing approximately 86% vinyl chloride, 11% vinyl acetate, and 3% maleic anhydride, made and sold by the B. F. Goodrich Co. under the trade name "Geon 443," and a terpolymer of approximately 86% vinyl chloride, 13% vinyl acetate, and 1% maleic anhydride, made and sold by the Union Carbide Corporation, New York, New York, under the trade name "Vinylite VMCH."

The preferred coating thickness in films of this invention is from about 0.0001 inch to about 0.00025 inch. The film can be coated on either one side or both sides; the latter is preferable. The thickness of the polyvinyl alcohol base is not critical and is usually in the range of approximately 0.0008 to 0.0012 inch.

The coating can be applied to the polyvinyl alcohol base by any means known in the art. For example, both the vinylidene chloride-vinyl chloride copolymer and the terpolymer can be dissolved in the proportions desired in the coating (i.e. about 5 to 10% terpolymer, balance vinylidene chloride-vinyl chloride copolymer) in an inert organic solvent. Methyl ethyl ketone is a preferred solvent; other suitable solvents include methyl isobutyl ketone, ethyl acetate, tetrahydrofuran, and the like. The solution can be made to any desired concentration, depending on the coating thickness desired. A solids content of about 15 to 25% is suitable for most applications. The solution can be applied to the polyvinyl alcohol base by conventional coating machinery. The film is then preferably dried at any desired temperature, e.g. about 40° to 110° C.

This invention will now be described with reference to specific embodiments thereof as illustrated by the following examples.

*Example 1*

A thin transparent film of 99.9% hydrolyzed polyvinyl alcohol, having a thickness of approximately 0.0008 inch and plasticized with 4 parts of glycerol per 100 parts of polyvinyl alcohol, was coated on both sides in sequence with a solution of a vinylidene chloride-vinyl chloride copolymer and a vinyl chloride-vinyl acetate-maleic anhydride terpolymer in methyl ethyl ketone. The total solids content of the solution was 20% by weight, and the weight ratio of copolymer to terpolymer was 15:1 (equivalent to a solids content of 94% copolymer and 6% terpolymer). The copolymer contained about 60% vinylidene chloride and 40% vinyl chloride, sold under the trade name "Geon 222." The terpolymer contained about 86% vinyl chloride, 11% vinyl acetate, and 3% maleic anhydride, sold under the trade name "Geon 443." The film was over-dried at 180° F. for 2 minutes after each side was coated.

The oxygen permeability of the coated film was 0.03 cc./100 in.²/day at 72° F. and 50% relative humidity, and 0.08 cc./100 in.²/day at 72° F. and 90% relative humidity. The water vapor permeability was 0.7 gm./100 in.²/day at 72° F. Oxygen permeability was measured by diffusion of oxygen through the film from an essentially pure oxygen atmosphere to an oxygen-free atmosphere, both at a total pressure of one atmosphere, at the indicated temperature and relative humidity. Water vapor permeability was measured by passage of water vapor through the film from a region of 100% relative humidity to a region of 50% relative humidity.

Adherence of the coating layers to the base layer was found to be satisfactory. Two tests, the cellophane tape test and the heat seal test, were used to measure adherence. For the first of these tests, a piece of adhesive cellophane tape was applied to the surface of the film and then pulled off quickly with no delamination. In the second test, two pieces of film were sealed together by the application of heat and pressure, and pulled apart after cooling. The seal was broken with only slight delamination in the vicinity of the seal and no delamination elsewhere. Heat seal strength was also found to be satisfactory.

Example 1 was repeated except that the ratio of vinylidene chloride-vinyl chloride copolymer to vinyl chloride-vinyl acetate-maleic anhydride terpolymer was 85:15. The water vapor permeability was 1.2 gm./100 in.²/day at 72° F., which is too high for effective prevention of water vapor transmission through the film.

*Example 2*

The procedude of Example 1 was repeated except that the terpolymer in the coating layer contained about 86% vinyl chloride, 13% vinyl acetate, and 1% maleic anhydride, sold under the trade name "Vinylite VMCH" by the Union Carbide Corporation. The resulting coated polyvinyl alcohol film was similar to that obtained in Example 1.

Various modifications can be made as will be evident to those skilled in the art. For example, conventional additives for improving slip can be incorporated in the coating composition. Static can be removed from films of this invention by conventional means, such as passage of the film through a dilute aqueous or alcoholic solution of a surface active agent such as glyceryl mono-oleate. Other modifications will be apparent to those skilled in the art.

We claim:

1. A coated film consisting essentially of a polyvinyl alcohol base sheet directly coated on at least one side with a self-adhering polymer mixture consisting essentially of about 90 to 95% of a copolymer of about 50 to 75% vinylidene chloride and 25 to 50% vinyl chloride, and about 5 to 10% of a terpolymer of about 75 to 94.5% vinyl chloride, 5 to 24.5% vinyl acetate, and 0.5 to 5% of a compound selected from the group consisting of ethylenically unsaturated aliphatic carboxylic acids and anhydrides thereof.

2. A coated film consisting essentially of a polyvinyl alcohol base sheet directly coated on at least one side with a self-adhering polymer mixture consisting essentially of about 90 to 95% of a copolymer of about 50 to 75% vinylidene chloride and 25 to 50% vinyl chloride, and about 5 to 10% of a terpolymer of about 75 to 94.5% vinyl chloride, 5 to 24.5% vinyl acetate, and 0.5 to 5% of maleic anhydride.

3. A process which comprises directly applying to a polyvinyl alcohol base film a solution of a copolymer of about 50 to 75% vinylidene chloride and 25 to 50% vinyl chloride and a terpolymer of about 75 to 94.5% vinyl chloride, 5 to 24.5% vinyl acetate, and 0.5 to 5% of a compound selected from the group consisting of ethylenically unsaturated aliphatic carboxylic acids and anhydrides thereof in an inert organic solvent, the vinylidene chloride-vinyl chloride copolymer constituting from about 90 to 95% of the total solids content of said solution.

4. A process which comprises directly applying to a polyvinyl alcohol base film a solution of a copolymer of about 50 to 75% vinylidene chloride and 25 to 50% vinyl chloride and a terpolymer of about 75 to 94.5% vinyl chloride, 5 to 24.5% vinyl acetate, and 0.5 to 5% of a compound selected from the group consisting of ethylenically unsaturated aliphatic carboxylic acids and anhydrides thereof in an inert organic solvent, the vinylidene chloride-vinyl chloride copolymer constituting from about 90 to 95% of the total solids content of said solution, and drying the film.

5. The process of claim 4 in which the solvent is methyl ethyl ketone.

6. A coated film consisting essentially of a polyvinyl alcohol base sheet directly coated on at least one side with a self-adhering polymer mixture consisting essentially of about 90 to 95% of a copolymer of about 50 to 75% vinylidene chloride and 25 to 50% vinyl chloride, and about 5 to 10% of a terpolymer of about 75 to 94.5% vinyl chloride, 5 to 24.5% vinyl acetate, and 0.5 to 5% of a compound selected from the group consisting of ethylenically unsaturated aliphatic carboxylic acids and anhydrides thereof, said film having a thickness in the range of about 0.0008" to 0.012" and said polymer mixture forming a coating on said at least one side of a thickness of about 0.0001" to about 0.00025".

7. A coated film as defined in claim 6 wherein said copolymer contains about 60% by weight vinylidene chloride and about 40% by weight vinyl chloride.

8. A coated film as defined in claim 7 wherein said terpolymer contains approximately 86% by weight vinyl chloride, 11 to 13% by weight vinyl acetate and 1 to 3% by weight maleic anhydride.

9. A coated film consisting essentially of a polyvinyl alcohol base sheet directly coated on at least one side with a self-adhering polymer mixture consisting essentially of about 90 to 95% of a copolymer of about 50 to 75% of vinylidene chloride and about 75 to 94.5% vinyl chloride, 5 to 24.5% vinyl acetate, and 0.5 to 5% of maleic anhydride, said film having a thickness in the range of about 0.0008" to 0.0012" and said polymer mixture forming a coating on said at least one side of a thickness of about 0.0001" to about 0.00025".

10. A process which comprises directly applying to a polyvinyl alcohol base film a solution of a copolymer of about 50 to 75% vinylidene chloride and 25 to 50% vinyl chloride and a terpolymer of about 75 to 94.5% vinyl chloride, 5 to 24.5% vinyl acetate, and 0.5 to 5% of a compound selected from the group consisting of ethylenically unsaturated aliphatic carboxylic acids and anhydrides thereof in an inert organic solvent, the vinylidene chloride-vinyl chloride copolymer constituting from about 90 to 95% of the total solids content of said solution, said film having a thickness of 0.0008" to 0.0012".

11. A process which comprises directly applying to a polyvinyl alcohol base film a solution of a copolymer of about 50 to 75% vinylidene chloride and 25 to 50% vinyl chloride and a terpolymer of about 75 to 94.5% vinyl chloride, 5 to 24.5% vinyl acetate, and 0.5 to 5% of a compound selected from the group consisting of ethylenically unsaturated aliphatic carboxylic acids and anhydrides thereof in an inert organic solvent, the vinylidene chloride-vinyl chloride copolymer constituting from about 90 to 95% of the total solids content of said solution, and drying the film, said film having a thickness of 0.0008″ to 0.0012″ and the coating deposited on the film from said solution having a thickness of about 0.0001″ to about 0.00025″.

12. A process as defined in claim 11 wherein said drying is effected at a temperature of 40° to 110° C.

13. A process as defined in claim 11 wherein said copolymer contains about 60% by weight vinylidene chloride and about 40% by weight vinyl chloride and said terpolymer contains approximately 86% by weight vinyl chloride, 11 to 13% by weight vinyl acetate and 1 to 3% by weight maleic anhydride.

References Cited in the file of this patent

UNITED STATES PATENTS

| | | |
|---|---|---|
| 2,702,580 | Bateman | Feb. 22, 1955 |
| 2,748,027 | Meier | May 29, 1956 |
| 2,946,702 | Bach | July 26, 1960 |
| 2,950,217 | Covington et al. | Aug. 23, 1960 |
| 2,979,419 | Hill et al. | Apr. 11, 1961 |
| 2,990,391 | Grantham | June 27, 1961 |

OTHER REFERENCES

Zimmerman, O. T., and Lavine, I.: Material Trade Names, Handbook of Industrial Research Service, Dover, N.H. (1953), pp. 253–254 and 606, and Supplement III, pp. 105–106.

UNITED STATES PATENT OFFICE
CERTIFICATE OF CORRECTION

Patent No. 3,136,657                      June 9, 1964

Daniel S. Dixler et al.

It is hereby certified that error appears in the above numbered patent requiring correction and that the said Letters Patent should read as corrected below.

Column 3, line 8, for "over-dried" read -- oven-dried --; line 51, for "incorporate" read -- incorporated --.

Signed and sealed this 17th day of November 1964.

(SEAL)
Attest:

ERNEST W. SWIDER
Attesting Officer

EDWARD J. BRENNER
Commissioner of Patents